(12) United States Patent
Swinford et al.

(10) Patent No.: US 6,552,806 B1
(45) Date of Patent: Apr. 22, 2003

(54) AUTOMATED MINIMIZATION OF OPTICAL PATH DIFFERENCE AND REFERENCE MIRROR FOCUS IN WHITE-LIGHT INTERFERENCE MICROSCOPE OBJECTIVE

(75) Inventors: Richard W. Swinford, Tucson, AZ (US); David J. Aziz, Tucson, AZ (US); Bryan W. Guenther, Tucson, AZ (US); Paul R. Unruh, Tucson, AZ (US)

(73) Assignee: Veeco Instruments Inc., Tucson, AZ (US)

( * ) Notice: Subject to any disclaimer, the term of this patent is extended or adjusted under 35 U.S.C. 154(b) by 0 days.

(21) Appl. No.: 09/497,567

(22) Filed: Feb. 3, 2000

(51) Int. Cl.[7] .................................................. G01B 9/02
(52) U.S. Cl. ........................................ 356/512; 356/497
(58) Field of Search ................................. 356/497, 511, 356/512; 359/371

(56) References Cited

U.S. PATENT DOCUMENTS

| | | | |
|---|---|---|---|
| 5,471,303 A | 11/1995 | Ai et al. | |
| 5,633,715 A | 5/1997 | Ai et al. | |
| 5,784,164 A | * 7/1998 | Deck et al. | 356/511 |
| 5,978,086 A | 11/1999 | Aziz et al. | |

* cited by examiner

*Primary Examiner*—Samuel A. Turner
*Assistant Examiner*—Patrick Connolly
(74) *Attorney, Agent, or Firm*—Antonio R. Durando; Durando Birdwell & Janke, PLC

(57) ABSTRACT

Average fringe contrast is determined by PSI measurements at each step of relatively large translations of the reference optics and mirror of a white-light Linnik interference objective and the resulting data are used to minimize the OPD between the reference and test beam paths of the instrument. Utilizing the same algorithms used in the art to perform conventional vertical scanning interferometry, the position of minimum OPD is determined by finding the position of maximum average fringe contrast. Furthermore, by automating the system with a precise translation mechanism, operator-to-operator variations are completely eliminated and the precision of the process of OPD minimization is greatly improved. In another embodiment of the invention, the optimal focal position of the reference mirror is found at the same time by calculating the average lateral variation of fringe contrast as a function of OPD and focal position. The optimal OPD and focal position correspond to the maximum average lateral variation of fringe contrast in the resulting three-dimensional space.

25 Claims, 15 Drawing Sheets

EXTENDED POSITION
(EXAGGERATED FOR CLARITY)

US 6,552,806 B1

AUTOMATED MINIMIZATION OF OPTICAL PATH DIFFERENCE AND REFERENCE MIRROR FOCUS IN WHITE-LIGHT INTERFERENCE MICROSCOPE OBJECTIVE

BACKGROUND OF THE INVENTION

1. Field of the Invention

This invention is related in general to the field of interferometry and, in particular, to an automated method and apparatus for minimizing the optical path difference between the reference and the test arms of a Linnik white-light interference objective.

2. Description of the Related Art

White-light interferometric devices typically utilize microscope objectives for simultaneously imaging a sample surface and a reference surface onto a detector in order to produce interference fringes representative of the height of the sample. As illustrated in simple schematic form in FIG. 1, a typical Linnik interference microscope includes an objective 10 focused on a test surface S and incorporating an interferometer. The interferometer comprises a beam splitter 12 and a reference mirror R such that the light beam W directed to the sample surface S is split and also directed toward the reference mirror.

As is well understood by those skilled in the art, the light beams reflected from the reference mirror R and the test surface S (the reference and test beams, respectively) are combined to produce interference fringes as a result of the optical path difference (OPD) between the reference and test beams. The light reflected by the test surface S interferes with the light reflected at the reference mirror R and, according to the principle of superposition, bright interference fringes are produced corresponding to all points on the reference mirror where the optical path difference of the light is equal to a multiple of its wavelength. In order for discernible fringes to appear, the OPD must be within the coherence length of the light source. Spectral filtering may be used to increase the coherence length of the light.

The light from the reference and sample surfaces is typically passed back through the interferometric microscope 10 and appropriate imaging optics 14 toward an imaging array 16 positioned in a camera in coaxial alignment with the objective. The imaging array usually consists of individual charge-coupled-device (CCD) cells or other sensing apparatus adapted to record a two-dimensional array of signals corresponding to interference effects produced by the interferometer as a result of light reflected at individual x-y coordinates or pixels in the surface S and the reference mirror R and received at corresponding individual cells in the array. Appropriate electronic hardware (not shown) is also provided to process the signals generated by each cell and transmit them to a computer 18 for further processing. Thus, an interference-fringe map is generated by detecting the intensity of the light signal received in each cell of the array. The map may be displayed on a monitor 20 connected to the processing unit 18. As mentioned, a filter 32 may be provided to optionally narrow the bandwidth of the light beam W to a predetermined value.

In a Linnik interferometer, a smooth test surface S is typically profiled by phase-shifting interferometry (PSI), typically by scanning the reference arm of the microscope objective 10. A piezoelectric translator or equivalent device (not shown in FIG. 1) is used in conventional manner to shift the reference optics 30 and mirror R together with respect to the sample surface S. Phase shifting is founded on the basic concept of varying the phase difference between two interfering beams in some known manner, such as by changing the optical path difference in discrete steps or linearly with time. Under such conditions, three or more measurements of the light intensity at a pixel of a receiving sensor array can be used to determine the relative phase of the light reflected from the point on a test surface corresponding to that pixel, with respect to the other points on the test surface. Based on such measurements at each pixel of coordinates x and y, a phase distribution map $\Phi(x,y)$ can be determined for the test surface, from which very accurate height data $h(x,y)$ are calculated in relation to the wavelength $\lambda$ of the light source used by the following general equation:

$$h(x, y) = \frac{\lambda}{4\pi}\Phi(x, y). \tag{1}$$

Phase-shifting interferometry provides a vertical resolution in the order of 1/100 of a wavelength or better. The technique is typically limited to measurements of smooth surfaces due to a height ambiguity encountered at phase steps greater than $\pi$.

Linnik interferometers are also used for vertical-scanning interferometry (VSI) of rough surfaces. VSI is a well-known technique where white light is used as the light source in an interferometer and the degree of modulation, or coherence, of interference fringes produced by the instrument is measured for various distances between the test surface and the reference surface of the interferometer (each corresponding to a different optical path difference) to determine surface height. The microscope objective is typically adapted for vertical movement (along the z coordinate). Thus, an interference-fringe map is generated by detecting the intensity of the light signal received in each cell of the light sensor as a function of the z-scan position. The position of the scanning mechanism corresponding to maximum interference at each pixel is determined and used, based on the distance from a reference point, to calculate the height of the surface at that pixel.

As shown in FIG. 1, the Linnik configuration of a microscope objective includes a white light source 22 and imaging optics 24 providing an illumination beam W to the system through a beam splitter or equivalent device 26. The illumination beam is then focused, ideally, in the entrance pupils E and E' of the reference and test imaging optics 30 and 28, respectively. This is known as Kohler illumination, and produces approximately uniform illumination on the sample surface S and the reference surface R. By way of calibration, the reference mirror R is set at the focal point of the imaging optics 30 through a process based on a visual determination of best focus produced by axially shifting the reference mirror with respect to its imaging optics 30 along a distance F, as one skilled in the art would readily understand. This is often accomplished by the introduction of a field stop in the illuminator (not shown in FIG. 1). When the diameter of the field stop is reduced sufficiently to bring its edges into the field of view, a sharp image of the edges is formed on the camera when the reference surface R is in focus. Copending application Ser. No. 09/452,334 discloses a mechanism for focusing the reference mirror R automatically, which provides an opportunity for periodic recalibration of the instrument.

Prior to carrying out surface profiling by PSI measurements, the distance between the sample surface S and its focusing optics 28 is also adjusted to produce a sharp, in-focus image of the sample. This is normally achieved by moving the entire objective 10 vertically with respect to the sample stage (although the same result could obviously be achieved as well by moving the stage). The distance F' (FIG. 1) between the lens 28 and the surface S is varied, either manually or automatically, until the sample surface is in focus. Typically, the optimal in-focus position of the sample surface is determined by visual observation of the best picture of the sample surface seen at the monitor 20. Alternatively, an image of the field stop, as described above, can be used to set the optimal in-focus position. Similarly, for VSI measurements, fringes are present at a given scan position only for portions of the surface that are in focus.

When a light of short coherence length is used, such as produced by the white-light source 22, interference between the return beams only occurs when the optical path difference between the test and the reference paths is within the coherence length of the system. The coherence length of a white-light source can be increased with spectral filtering. Therefore, it is necessary to minimize the OPD in order to obtain satisfactory fringe contrast for PSI and VSI measurements. In general, for optimum performance the OPD between the reference and test paths must be less than approximately one wavelength. If a 40 nm bandwidth red light source is used, the coherence length is about 9 $\mu$m and the OPD between the reference and test paths must be less than 0.6 $\mu$m.

If a narrower bandwidth is chosen to carry out the interferometric measurements, such as with the use of a laser light, the coherence length and hence the OPD can be much greater, but stricter operational requirements render the commercial use of this type of interferometer less desirable for many applications. Therefore, short coherence lengths are preferred in many cases and the sample and reference path length difference must then necessarily be placed within very close tolerances. Minute changes in the optical path difference between the reference and test surfaces are sufficient to cause degradation of the fringe quality seen at the sensor 16.

Therefore, the quality of the phase-shifting and vertical-scanning measurements are also directly related to the degree to which the OPD is minimized.

A manual control is typically provided to adjust the length of the optical path of either the reference or the test beam. For example, a typical adjustment consists of manually translating the lens 30 and the reference mirror R together (thereby preserving the in-focus position of the reference mirror) with respect to the splitter 12 along a distance D (see FIG. 1), so as to generate the best visual fringe contrast. This adjustment is performed prior to performing measurements of the test sample S. In phase-shifting, measurements are accomplished using a scanning mechanism, typically a piezoelectric element, that also shifts the lens 30 and mirror R together in the spatial dimension of the distance D, herein also referred to as the D direction. In vertical-scanning, measurements are made by varying the distance F', either by moving the objective 10 or the sample S. Obviously, the OPD adjustment is limited by the subjective nature of human measurements and by the relatively coarse ability of the human eye to discern degrees of contrast in an interferogram. This is particularly true in the case of nulled fringes, where a single, uniform fringe covers the entire field-of-view.

As interference microscopes have become standard quality-control tools in production environments, such as for testing the topography of magnetic heads, greater measurement precision and repeatability are required. Such interference microscopes are now capable of making measurements with sub-nanometer precision. Accordingly, the precise minimization of the OPD between the reference mirror and the test surface has become more and more critical. This is especially true with objectives of high numerical aperture and correspondingly short depth of focus. Even though it is possible to maximize the fringe contrast (minimum OPD) in the Linnik interferometer at a condition where the reference mirror is out of focus, this condition is known to degrade the measurement performance of interference microscopes, as detailed in U.S. Pat. No. 5,978,086.

It has therefore become necessary to obtain extremely tight levels of control over the length of the reference path with respect to the test path, encompassing distances D and F in FIG. 1. In addition, it would be very desirable to have an automated method and apparatus for minimizing the OPD in white-light interference objectives in order to avoid the subjectivity and lack of precision of human measurements. The present invention is directed at improving the quality of the fringes generated by the interference between the reference and test beams by ensuring that the OPD between the two beams is optimally minimized. Two solutions are provided for optimizing the objective prior to performing phase-shifting or vertical-scanning interferometry. One solution is provided by maximizing the fringe contrast in the process of OPD minimization. It is suitable for general test surfaces, but requires separate optimization of reference mirror focus. The second solution entails maximizing the fringe modulation across the test surface. While it is suitable for a limited number of test surfaces with specific attributes, it allows for the simultaneous optimization of reference mirror focus and OPD, and can be employed in the critical measurement of magnetic heads.

BRIEF SUMMARY OF THE INVENTION

One primary object of this invention is a method for optimizing the process of minimization of the optical path difference between the reference and test beams of a white-light Linnik interferometer.

Another primary objective of the invention is a method for setting the in-focus position of the reference surface of an interferometric microscope objective.

Another object of the invention is a method that is suitable for automated implementation.

Still another objective is a method and corresponding implementing apparatus that are suitable for automated use while the interferometer is in service for quality control in an assembly line.

Another goal of the invention is a method and apparatus that are suitable for incorporation within existing instruments.

A final object is a procedure that can be implemented easily and economically according to the above stated criteria.

Therefore, according to these and other objectives, the present invention consists of incorporating a mechanism for producing relatively large translations of the reference optics and mirror in a white-light Linnik interference objective and carrying out PSI measurements while the OPD between the reference and test beams is varied. Utilizing the same algorithms used in the art to perform conventional phase shifting interferometry, the position of minimum OPD is determined by finding the corresponding position of maximum intensity contrast of the interference fringes resulting from the superposition of the reference and test beams as the OPD is varied. Alternatively, for a test surface with specific characteristics, such as a magnetic head air bearing surface, the OPD is minimized and the reference mirror is simultaneously focused by maximizing the variation in fringe modulation across the test surface. By automating the system with a precise translation mechanism, operator-to-operator variations are completely eliminated and the precision of the process of OPD minimization and reference mirror focus are greatly improved.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only one of the various ways in which the invention may be practiced.

DESCRIPTION OF THE PREFERRED EMBODIMENT OF THE INVENTION

The present invention is based on the idea of maximizing fringe modulation or the spatial variation of fringe modulation in order to minimize the optical path difference between the reference path and the test path of a white-light interference objective in a white-light Linnik interferometer. The approach makes it possible to automate the process and optimize the quality of the resulting PSI or VSI profiling measurements. For the purposes of this disclosure, the term white light is intended to refer to any broad-bandwidth light such as produced by halogen lamps, arc lamps, and LEDs, which are often also filtered to reduce the bandwidth to a particular wavelength range of interest. In the examples described below, white light filtered to a 40-nm bandwidth with about 600-nm center wavelength was used. The reference symbols F, D, and F' are used to refer (as also defined above) to the distances between reference mirror and reference optics, reference optics and microscope splitter, and sample surface and microscope splitter, respectively, as well as to the spatial dimension or direction of these parameters.

Figure 1:
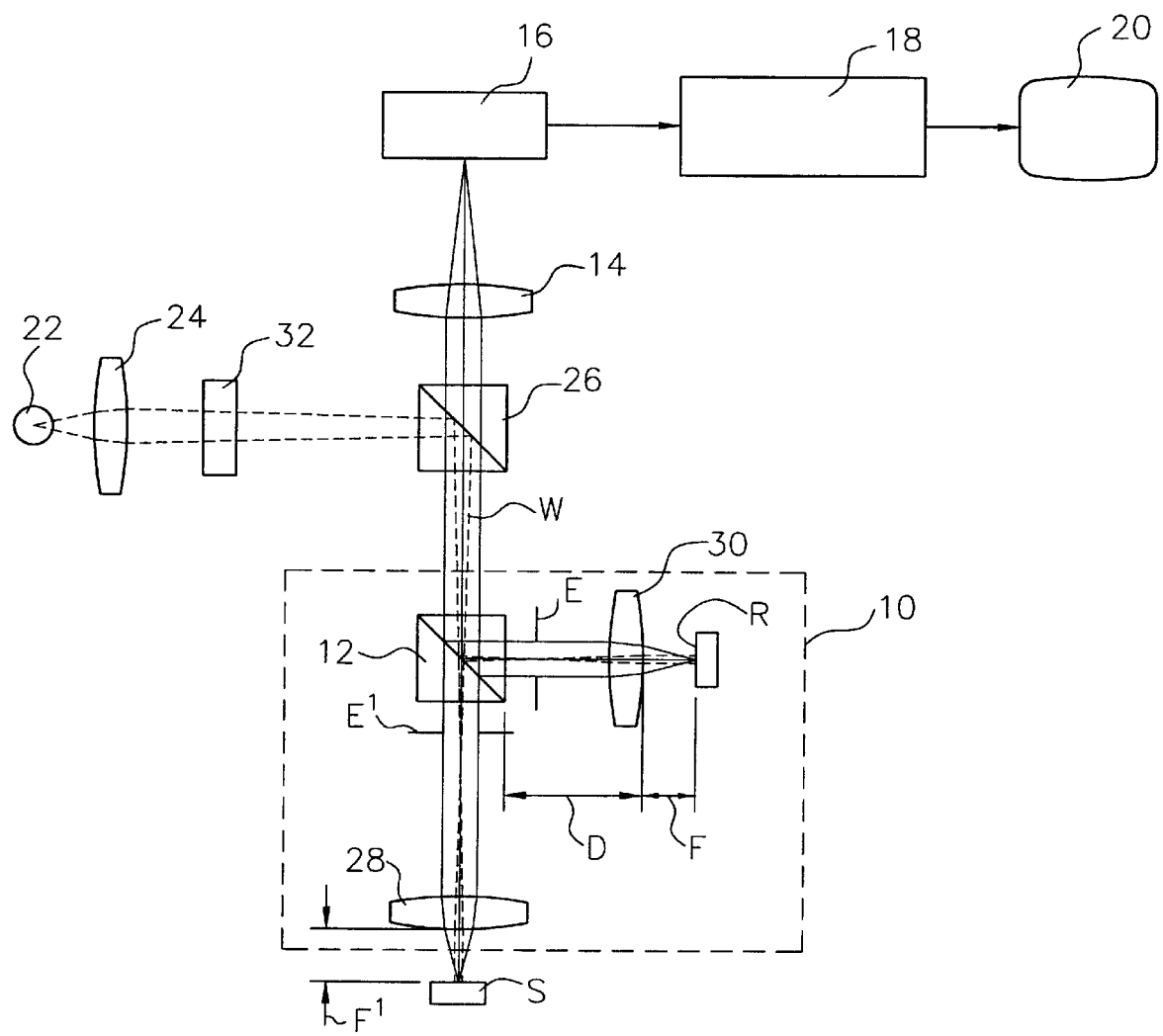
FIG. 1 is a simplified schematic representation of a prior-art Linnik interferometric microscope.
Figure 2:
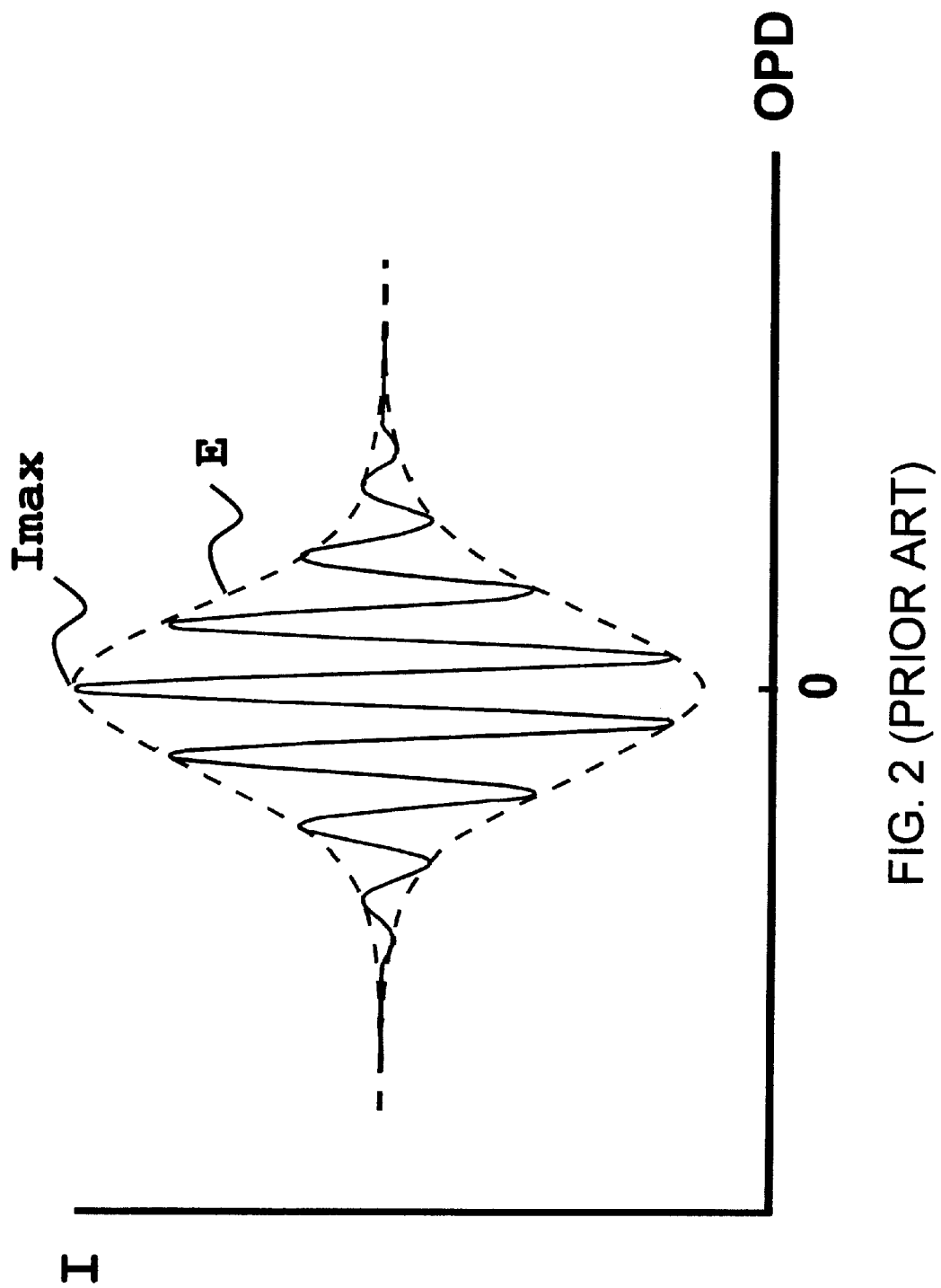
FIG. 2 is a typical intensity signal obtained from a detector cell in the image plane of an interferometer as the OPD is varied by vertically scanning the objective or the test sample, or by varying the reference path length.

The prior art discloses various ways by which VSI may be implemented to determine surface height by calculating the degree of fringe modulation, or coherence, of the interference fringes produced at the light detector for various OPDs between the test surface and the reference surface of the interferometer. These methods involve a determination of the scanning position corresponding to the peak of the modulation envelope of the intensity measurements collected during scanning. When white light is used as the source of illumination, the visibility of the fringes drops off rapidly from its maximum value at minimum OPD. FIG. 2 illustrates the modulation envelope E of a typical intensity signal I (irradiance) received at a detector cell in the image plane of the interferometer as the OPD is varied by vertically scanning the sample (or the objective). A measurement of relative surface height at the vertical-scanning point corresponding to the fringe-modulation peak Imax can thus be made. By simultaneously carrying out the procedure in parallel for each detector cell during vertical scanning, a three-dimensional height map can be obtained for the surface of the test sample. The point of maximum fringe visibility can be calculated from irradiance data using several known techniques. See, for example, the methods disclosed in U.S. Pat. No. 5,471,303 and U.S. Pat. No. 5,633,715.

Figure 3:
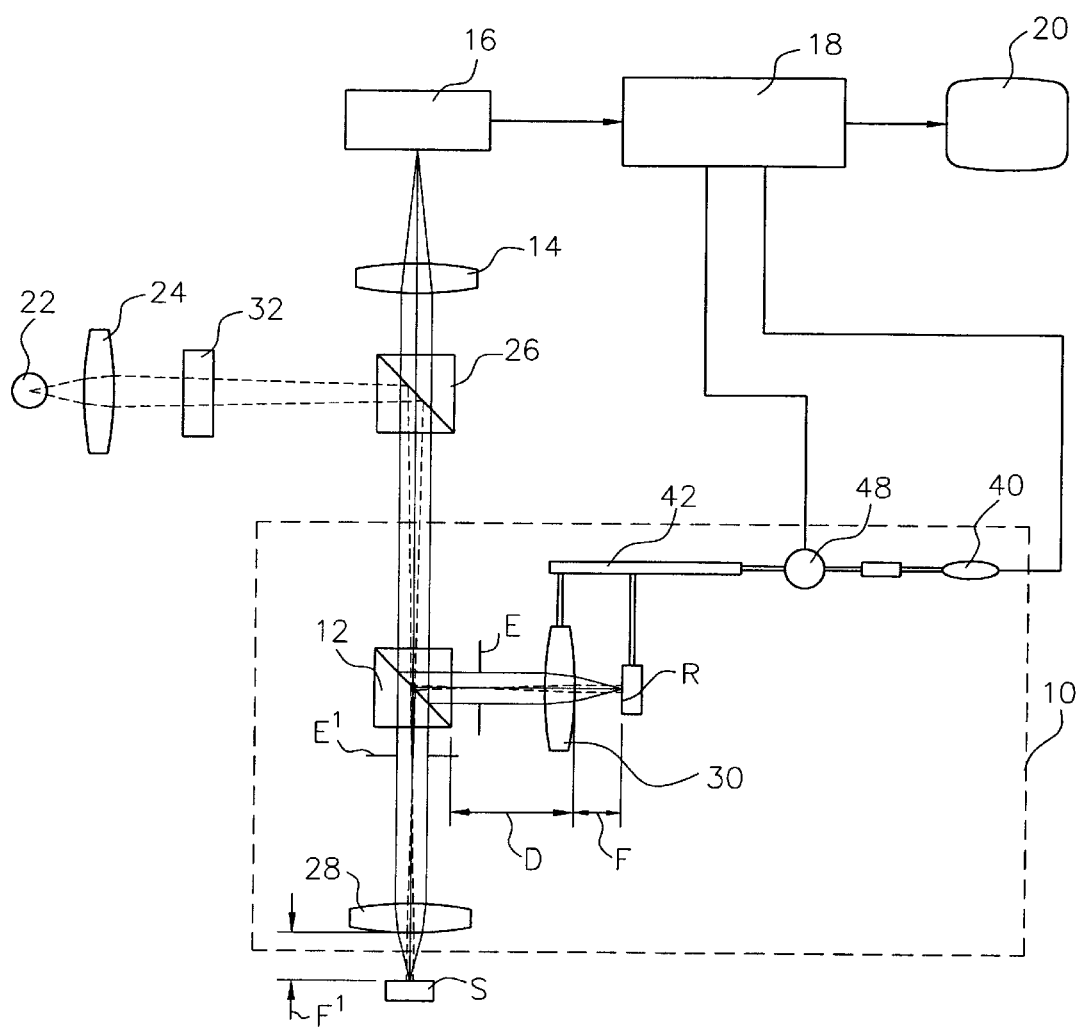
FIG. 3 is a schematic representation of the microscope objective of FIG. 1 incorporating a scanning mechanism for translating the reference optics and mirror with reference to the sample surface.

According to the present invention, additional positioning mechanisms are incorporated into the conventional hardware of a Linnik interference objective. Referring to the drawings, wherein like parts are designated throughout with like numerals and symbols, FIG. 3 shows schematically a gear motor or equivalent device 40 rigidly coupled to a mounting structure 42 holding the lens 30 and the reference mirror R in fixed spatial relationship, so that the motor can translate both units together along the reference optical path of the objective 10. The gear motor 40 is used to vary the distance D between the beam splitter 12 and the structure 42

(i.e., the assembly containing the lens 30 and mirror R) in order to equalize the optical paths of the reference and test beams. Due to the relatively large adjustments that may be necessary to facilitate assembly of the objective 10 with typical mechanical components, the gear motor 40 is preferably selected with a range of about ½ mm, and in any event sufficient to translate the lens 30 and mirror R to a position in the D direction where the OPD is within the coherence length of the light source. Once adjusted to its nominal position, small, occasional motions in the position of lens 30 and mirror R to accommodate thermal, spectral, and other changes are required. A piezoelectric element 48, also acting on the reference mirror R and lens 30 through the common support structure 42, is provided to effect phase-shifting measurements after calibration.

Figure 4:
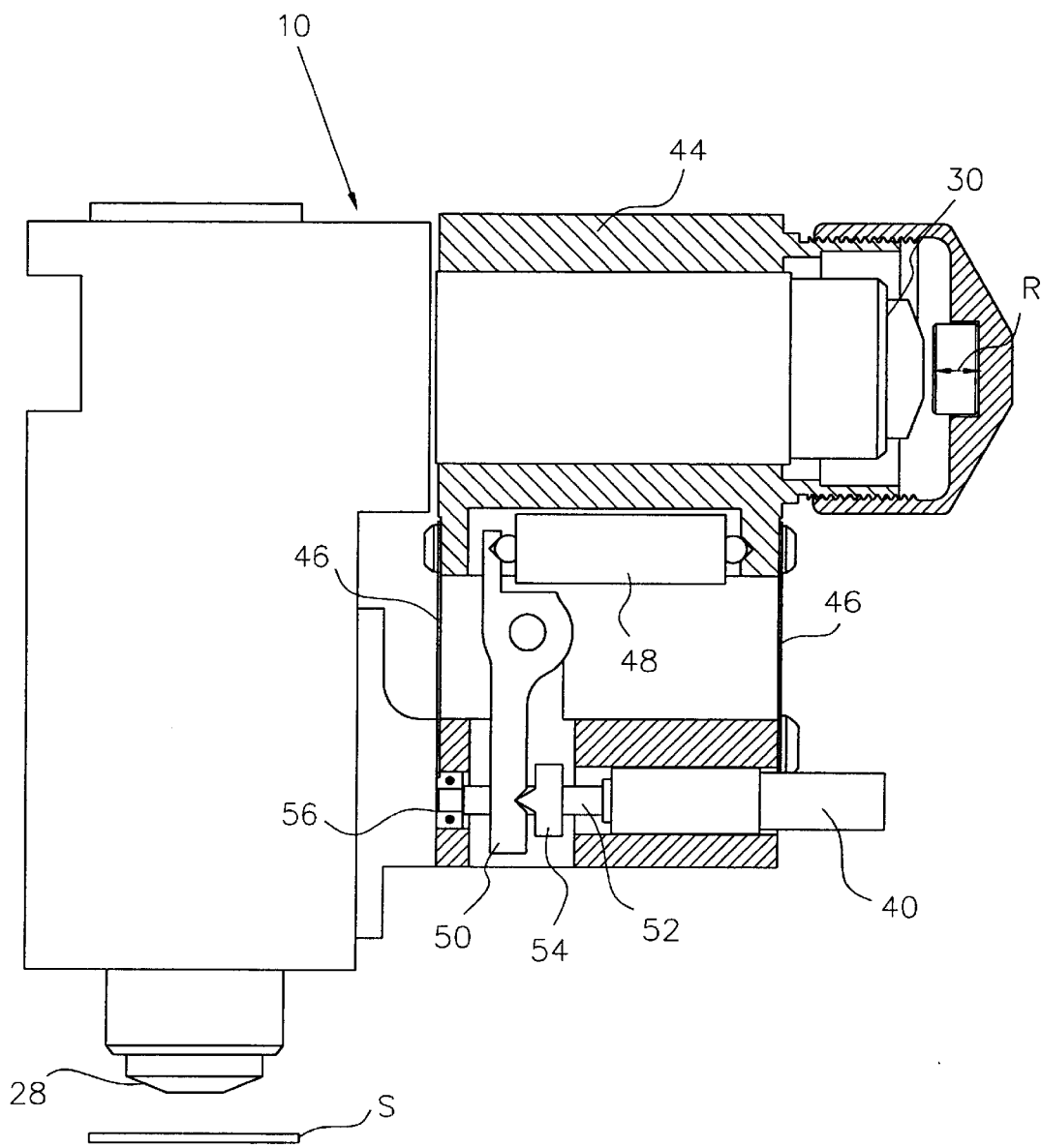
FIG. 4 is a partially cut-out view of an interference objective according to one preferred embodiment of the invention.

In practice, the system of the invention is implemented by serially combining the gear motor or equivalent mechanism 40 used for minimizing OPD with the conventional piezoelectric mechanism used for conducting PSI profiling measurements. As illustrated in the partially cut-out view of FIG. 4, the reference mirror R and lens 30 are fixedly assembled in an objective sleeve 44 mounted on the main body of the interference objective 10 by means of vertical flexures 46. A piezoelectric actuator 48 causes the horizontal outward translation of the sleeve 44 against the flexures 46 that urge the sleeve toward the beam splitter 12 (not seen in FIG. 4). The whole mechanism of the piezoelectric actuator 48 is coupled to the upper end of a pivoted lever arm 50, and the lower end of the arm is coupled to the motor 40 of the invention. In the preferred embodiment of the invention, the output shaft of the motor 40 consists of a lead screw 52 threaded through a stationary lead nut 54 that engages the lever arm 50 by means of two lateral V-shaped ridges connected to conforming grooves in the lever arm. The screw 52 passes through the lever arm and is supported by a bearing 56 in the main body of the objective.

Figure 5:
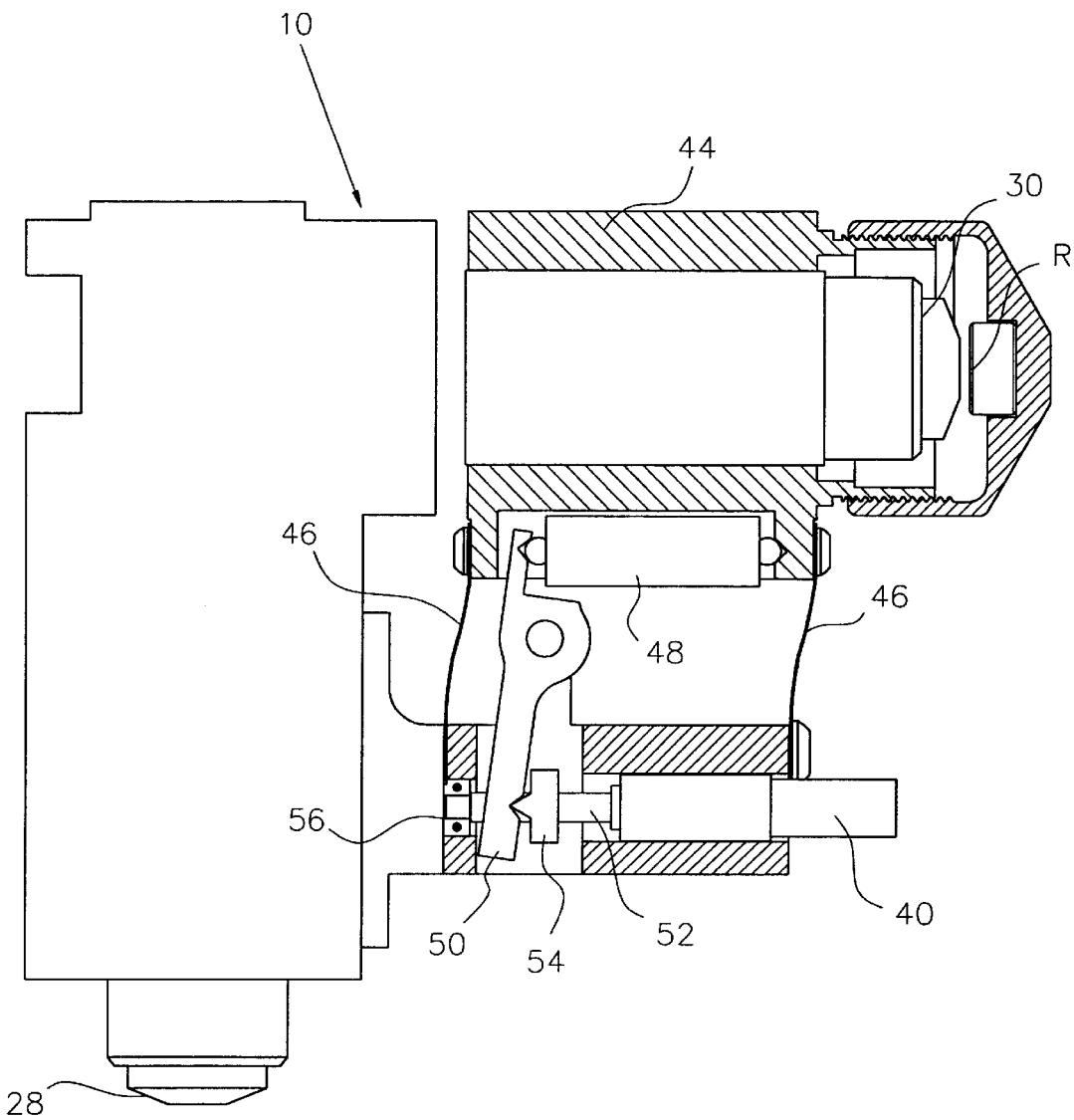
FIG. 5 is a view of the interference objective of FIG. 4 where the reference sleeve is shown in exaggerated extended position for clarity.

Thus, the series combination of the motor 40 and piezo actuator 48 provide a scanning mechanism capable of translating the objective sleeve 44 (and with it the reference optics 30 and mirror R) for the purpose of minimizing OPD as well as for performing phase-shifting measurements. FIG. 5 illustrates the extended position of the sleeve 44 with reference to the main body of the objective 10. During OPD minimization, which may occur within the noted range of about ½ mm, the short-range actuator 48 functions as a coupling device to transmit the motion of the lever arm 50 to the sleeve 44 while the long-range motor 40 effects relatively large incremental steps. At each of these incremental positions during the long-range translation, the motor 40 is stopped and a measurement is made using the short-range piezoelectric actuator 48 and white light reduced in bandwidth and centered around an appropriate wavelength by the filter 32. This measurement is referred herein as a PSI measurement because it is conducted in the same manner of conventional PSI measurements. Instead of measuring phase shift, though, the recorded frames of intensity data are used to produce average modulation data, which are then utilized as individual points to generate an average modulation curve tracking the long-range scan produced by the motor 40. As well understood in the art, modulation (commonly also referred to as visibility or contrast) is defined as the ratio between the difference and the sum of the maximum and minimum intensities recorded over a predetermined scan range (i.e., modulation=$[I_{max}-I_{min}]/[I_{max}+I_{min}]$).

Figure 6:
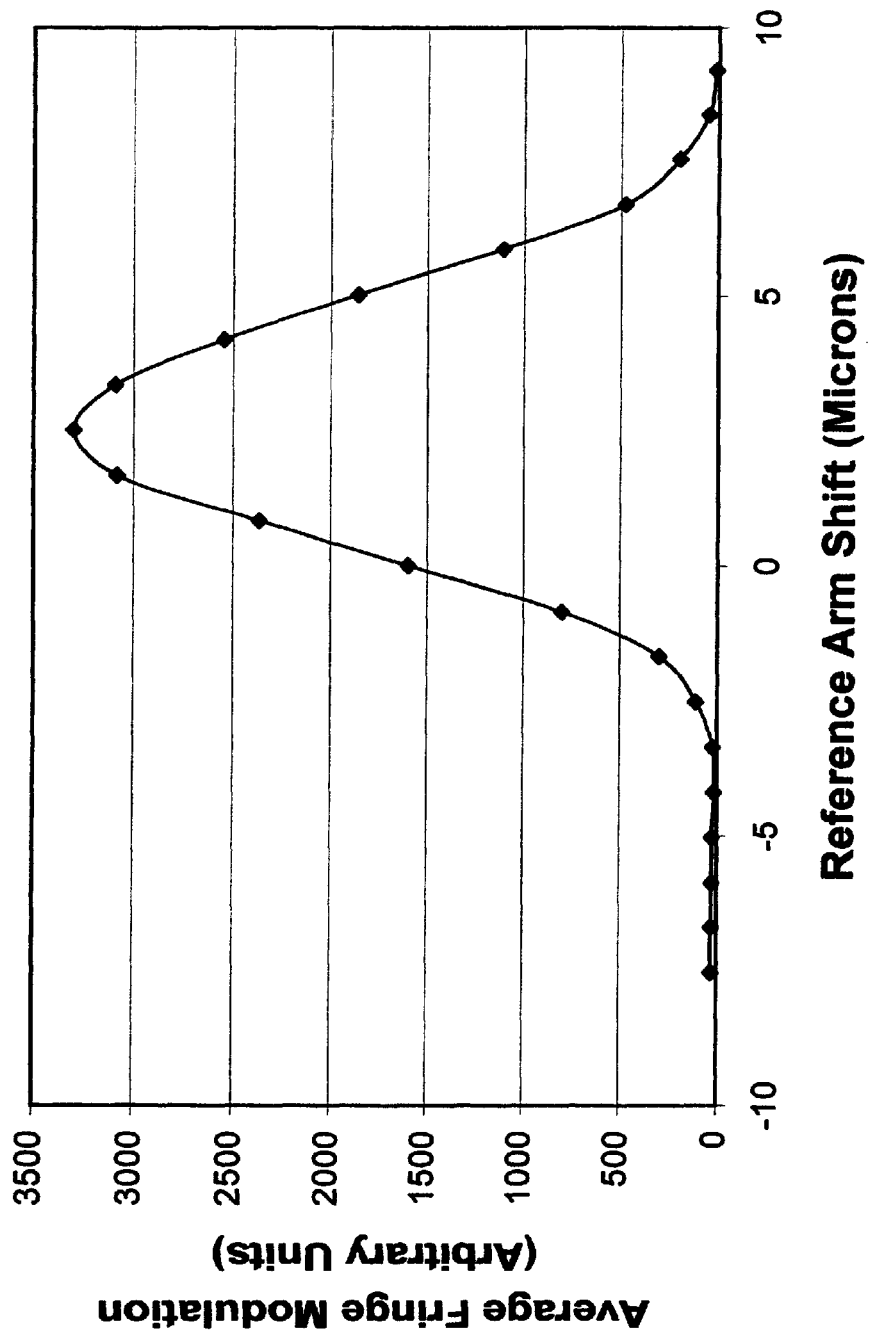
FIG. 6 shows the fringe modulation for an examplary PSI measurement as a function of optical path difference in a Linnik objective, where the spectral bandwidth of the light is approximately 40 nm with center wavelength of about 600 nm.

Each PSI measurement causes the signal at the detector to vary approximately sinusoidally, as illustrated in FIG. 2. The average fringe modulation for the entire pixel array is recorded at each translation point by some averaging method (simple arithmetic averaging was used in testing the concept of the invention). Following long-range translation of the objective sleeve 44 through a predetermined range of motion, the translation location where the average fringe modulation is at a maximum is determined (i.e. the peak of the envelope, as illustrated in FIG. 6, where incremental long-range steps of about ⅚ of a micron are shown for illustration), and the objective sleeve is returned to this position. If the peak fringe modulation is not found within the selected translation range, the range is increased and the procedure is repeated. Obviously, various known methods can be adopted to select the appropriate length of the long-range scan, its step size, and origin. For example, it may be advantageous to change the step size during a scan where modulation is measured for relatively large ranges, but the fundamental procedure is the same. The invention was tested by judiciously selecting initial values for these parameters, shifting the origin half the selected scan range in one direction from the current OPD position, and then scanning incrementally in the opposite direction over the selected range length.

When the point of minimum OPD is found, the calibration process is completed and normal PSI profilometric measurements may be carried out with white light (which may be appropriately filtered) in conventional manner using the piezoelectric actuator 48 while the motor 40 is inactive. It is noted that PSI measurements may also be carried out by varying the distance F or the distance F' (FIG. 3), although this is generally inferior for PSI measurements at high numerical apertures because of the more non-collimated condition and corresponding error introduced by such lenses. During all phases of operation, the flexures 46 urge the objective sleeve 44 toward the splitter 12 (see FIG. 3); that is, toward a direction of decreasing reference-beam path length.

Figure 7:
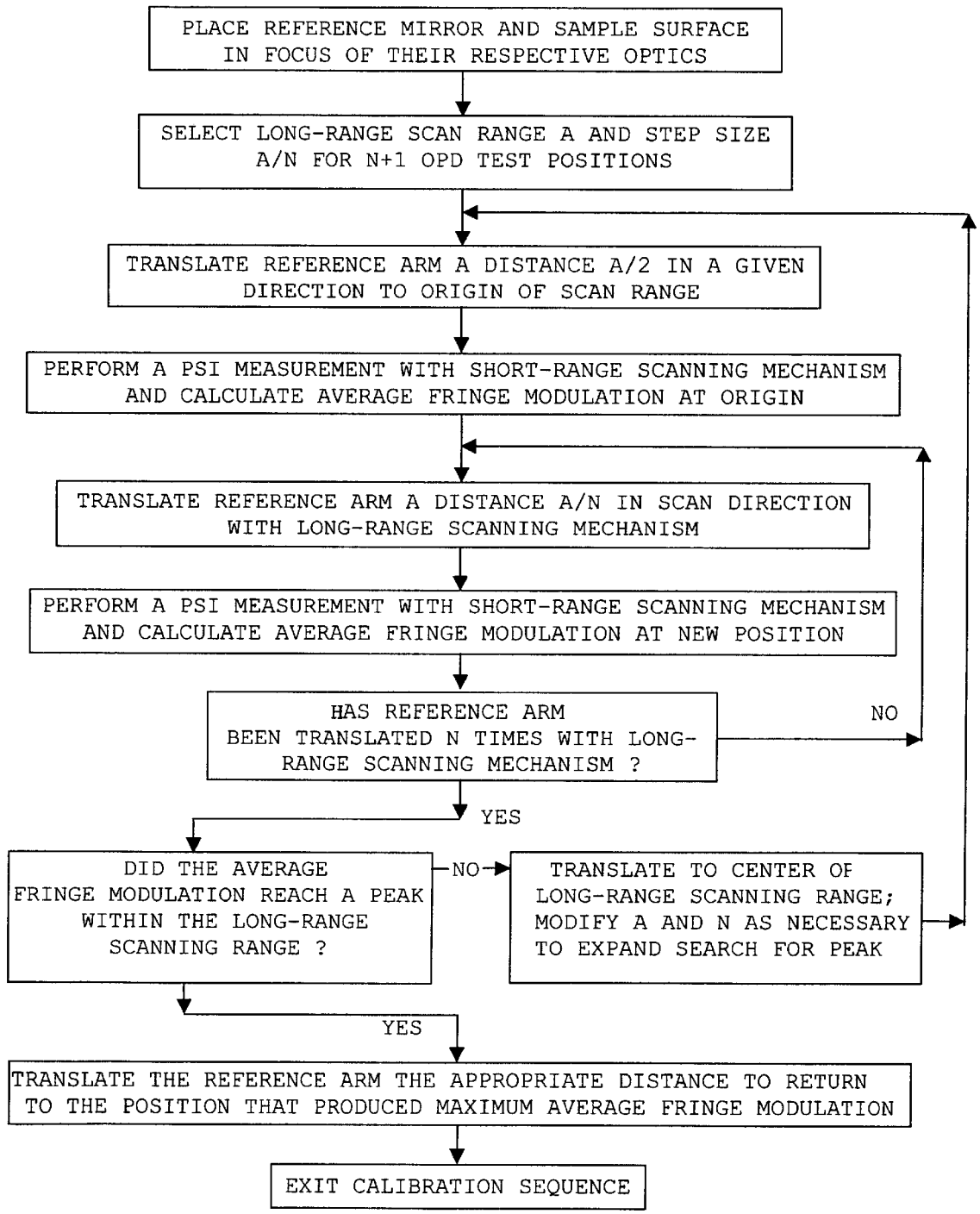
FIG. 7 is a diagram of the steps involved in the procedure of the invention for OPD minimization by fringe contrast maximization.

In operation, the procedure of the invention is carried out advantageously in automatic fashion by first focusing the reference mirror R within the focal plane of the lens 30; focusing the test surface S with respect to its optics 28; and then minimizing the OPD between the reference and test optical paths by monitoring the average fringe modulation through short-range PSI measurements while scanning the reference arm of the objective with the long-range motorized mechanism, as described. These steps can be automated in relatively straightforward manner by adapting the same algorithms used for conventional VSI and PSI measurements. When the position of maximum average fringe modulation is found through the calibration process, the test surface S can be profiled by performing PSI after switching to the short-range piezoelectric scanner (illustrated by element 48), or by VSI in the conventional manner (scanning the objective or the sample towards or away from each other). The procedure is outlined in FIG. 7.

Figure 8:
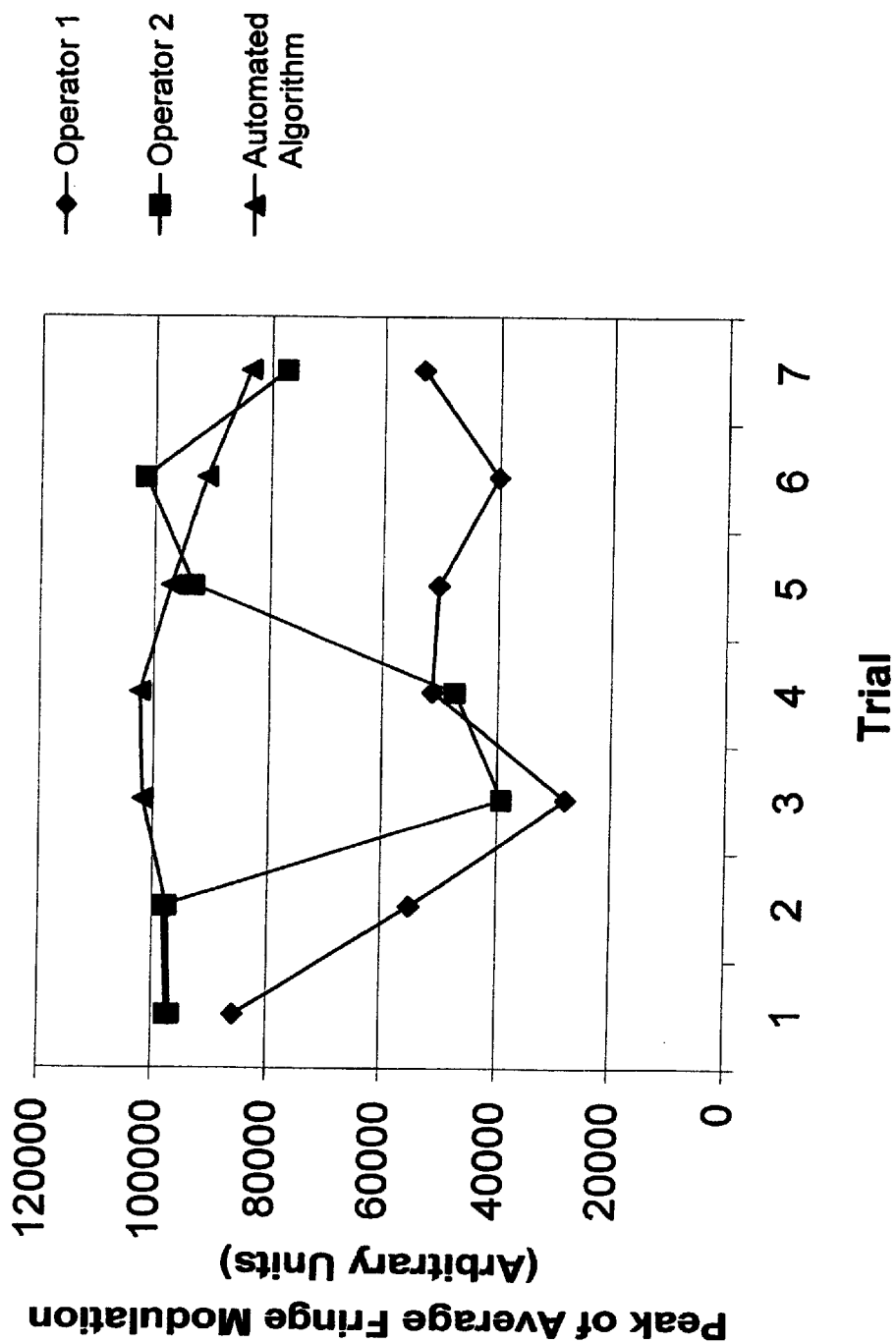
FIG. 8 shows the fringe modulation for a series of examplary trials, where the OPD was minimized with the automated algorithm of the invention and manually by two different operators.

Thus, a new procedure and apparatus have been disclosed to improve the process of bringing the reference and test optical paths to within a small fraction of the coherence length of the light source. By utilizing a motorized implementation, the invention makes it possible to automate the procedure and optimize the process of minimization of the OPD between the test and reference beams. FIG. 8 illustrates the improvement provided by the invention in terms of consistency and repeatability in the process of OPD minimization. Over the course of seven trials conducted both automatically and manually by two separate operators, the range of peak average modulation corresponding to minimum OPD determined manually was three times as large, for both operators, as the range measured automatically.

As detailed in U.S. Pat. No. 5,978,086, it is critical to avoid shifts of the reference mirror R away from its best focus position. Therefore, it would be very advantageous if it were possible to reset the mirror's best-focus position as part of the same procedure by which the OPD is minimized. According to another aspect of the invention, we found that this can be accomplished if a test surface with specific characteristics is used.

In an effort to solve this problem, we investigated average fringe modulation as a function of changes of both the D and F distances (see FIG. 3). We discovered that an average-modulation envelope such as shown in FIG. 2 can be observed and used advantageously from scanning in the OPD distance D even when the reference mirror R is away from its best focus position. That is, a poorly focused reference mirror still produces a significant peak in the average modulation curve obtained while scanning over the distance D (FIG. 3) to minimize OPD. Therefore, the procedure outlined above to optimize OPD (FIG. 7) is relatively insensitive to the focal position of the reference mirror. Unfortunately, this means that a single solution for maximum average fringe modulation as a function of D and F (i.e., in D,F space) does not exist.

In order to effectively determine both the D and F parameters at the same time, the functionality of the observed variable must provide a single-point peak in D,F space. We discovered that such an observable variable exists in the average lateral variation of modulation, rather than in the average modulation defined above. Average lateral variation of modulation is defined as the average change in modulation between proximate pixels, as further detailed below for the purposes of this disclosure. Accordingly, we selected a test surface S smooth enough for carrying out PSI measurements, but exhibiting sufficient nonuniformity in reflectivity to produce lateral variations in modulation. We found that we can use this fact, coupled with the physically smooth nature of the test surface, to optimize reference focus and OPD at the same time by noting that the average lateral variation in modulation will reach a maximum when both variables D and F are optimized.

Thus, there exists a three-dimensional solution space wherein the average lateral variation of fringe modulation can be plotted as a function of adjustment axes D and F. This is accomplished by varying both D and F and recording the average lateral variation of fringe modulation at each coordinate point in D,F space. The lateral variation of modulation $V(x,y)$ is calculated at every detector-surface pixel location $(x,y)$ by comparing the modulation $M(x,y)$ at pixel $(x,y)$ to its "lateral neighbors" as follows:

$$V(x,y)=abs\{M(x,y)-[M(x+G_x,y)+M(x-G_x,y)+M(x,y+G_y)+M(x,y-G_y)]/4\}, \quad (2)$$

where $G_x$ and $G_y$ are the X and Y granularities, respectively. $G_x$ and $G_y$ represent the typical "grain size" in the modulation array, the grains being caused by dissimilar-material effects on the modulation, as well understood in standard image-processing techniques. For the purposes of the tests of the invention, we found that a $G_x$ and a $G_y$ equal to 10 (that is, comparing a pixel to neighbors ten steps removed) was optimal for the optical resolution provided by the system).

Figure 9:
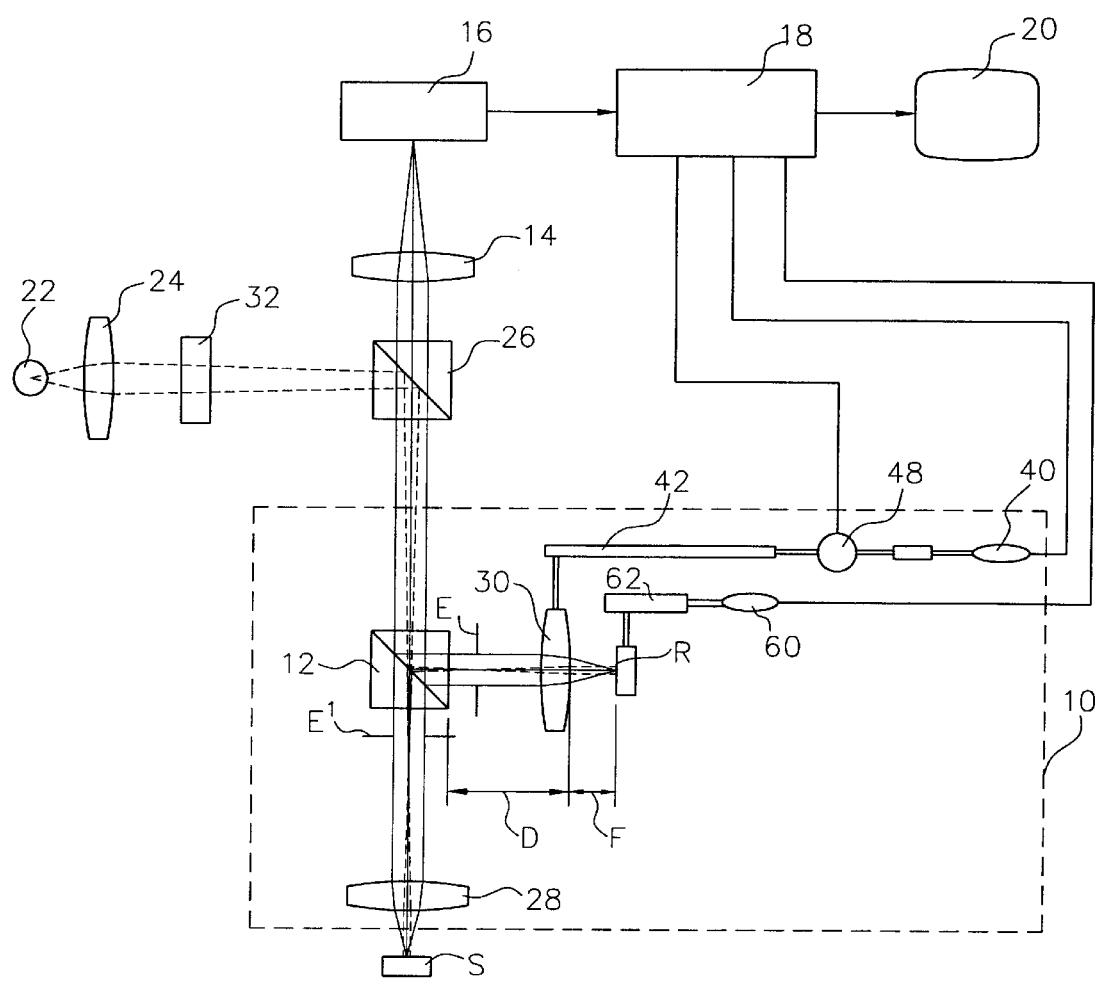
FIG. 9 is a schematic representation of the microscope objective of FIG. 1 incorporating an alternative preferred embodiment of the invention, which includes a first scanning mechanism for translating the reference optics and mirror in relation to the sample surface as well as a second scanning mechanism for translating the reference mirror in relation to the reference optics.
Figure 10:
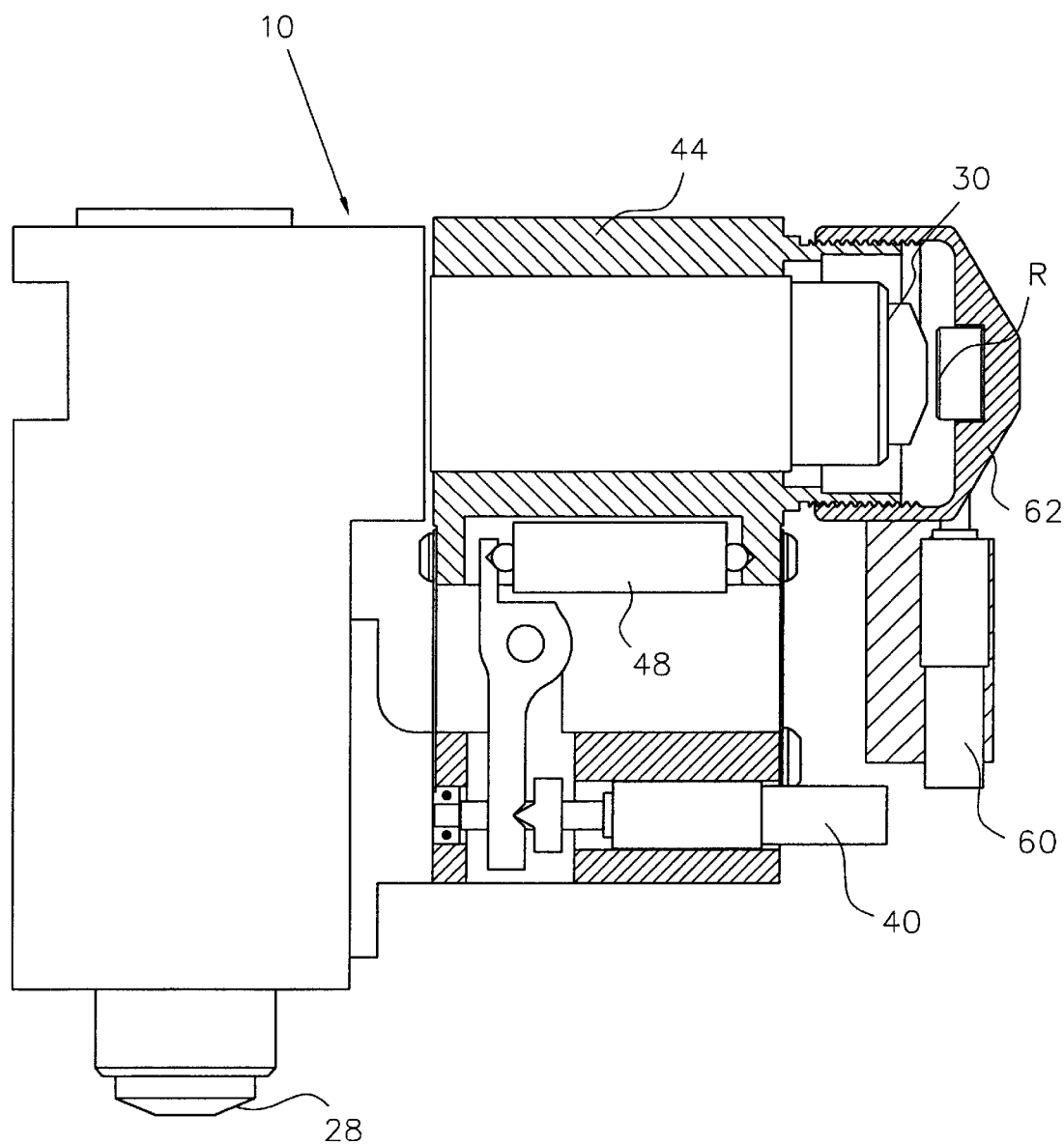
FIG. 10 is a partially cut-out view of an interference objective according to the embodiment of FIG. 9.

Thus, according to this aspect of the invention, an additional scanning mechanism 60 is required to translate the reference mirror R with respect to the lens 30, as illustrated schematically in FIG. 9. In practice, the mechanism 60 consists of a motor 60 adapted to rotate a collar 62 that supports the mirror R and is threaded onto the sleeve 44 holding the reference lens 30, as shown in FIG. 10. Therefore, as the collar 62 rotates, the distance F is varied (FIG. 9).

Figure 11:
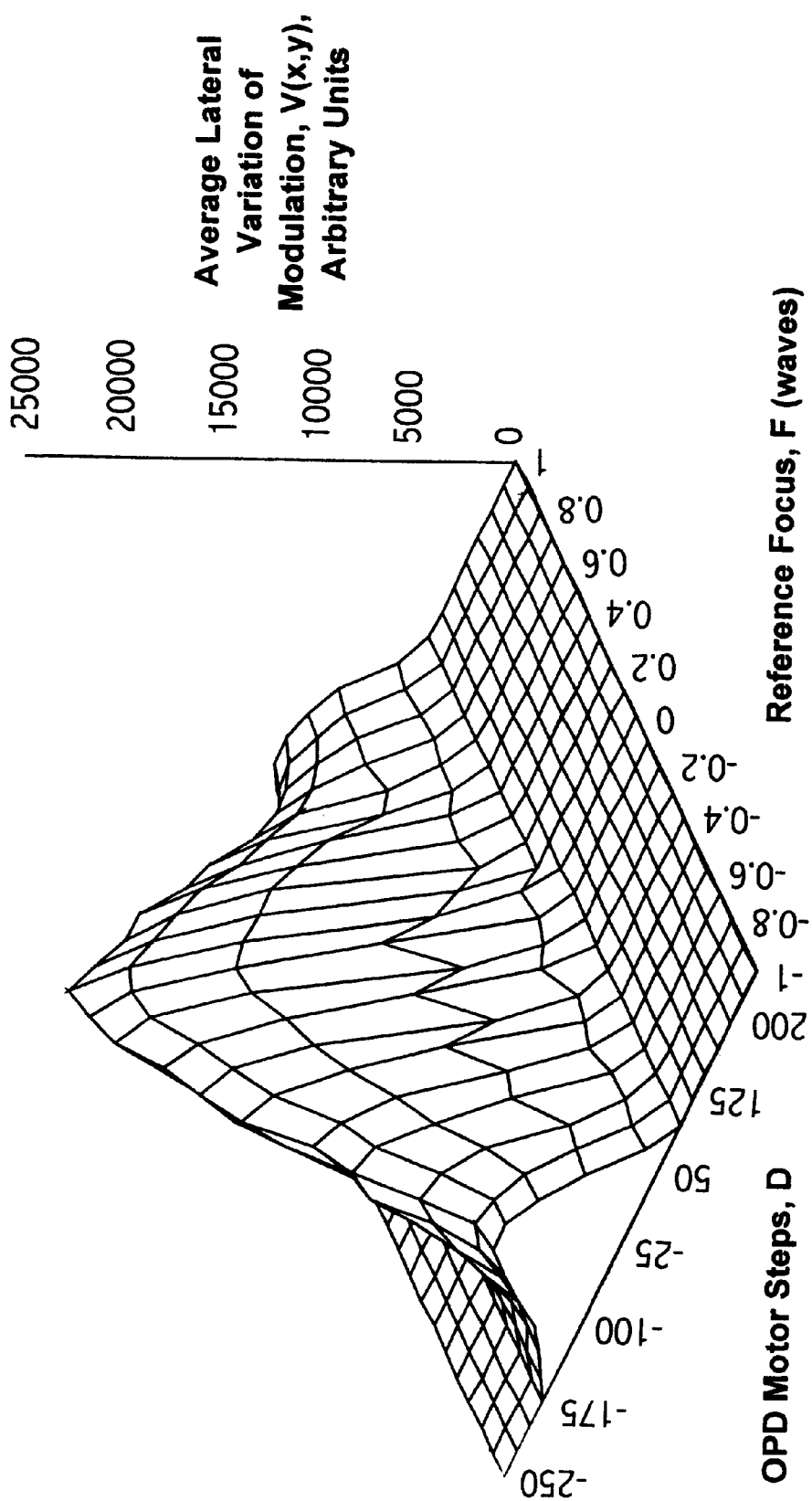
FIG. 11 is a three-dimensional plot of average fringe-modulation lateral variation as a function of both OPD and focal distance changes.
Figure 12:
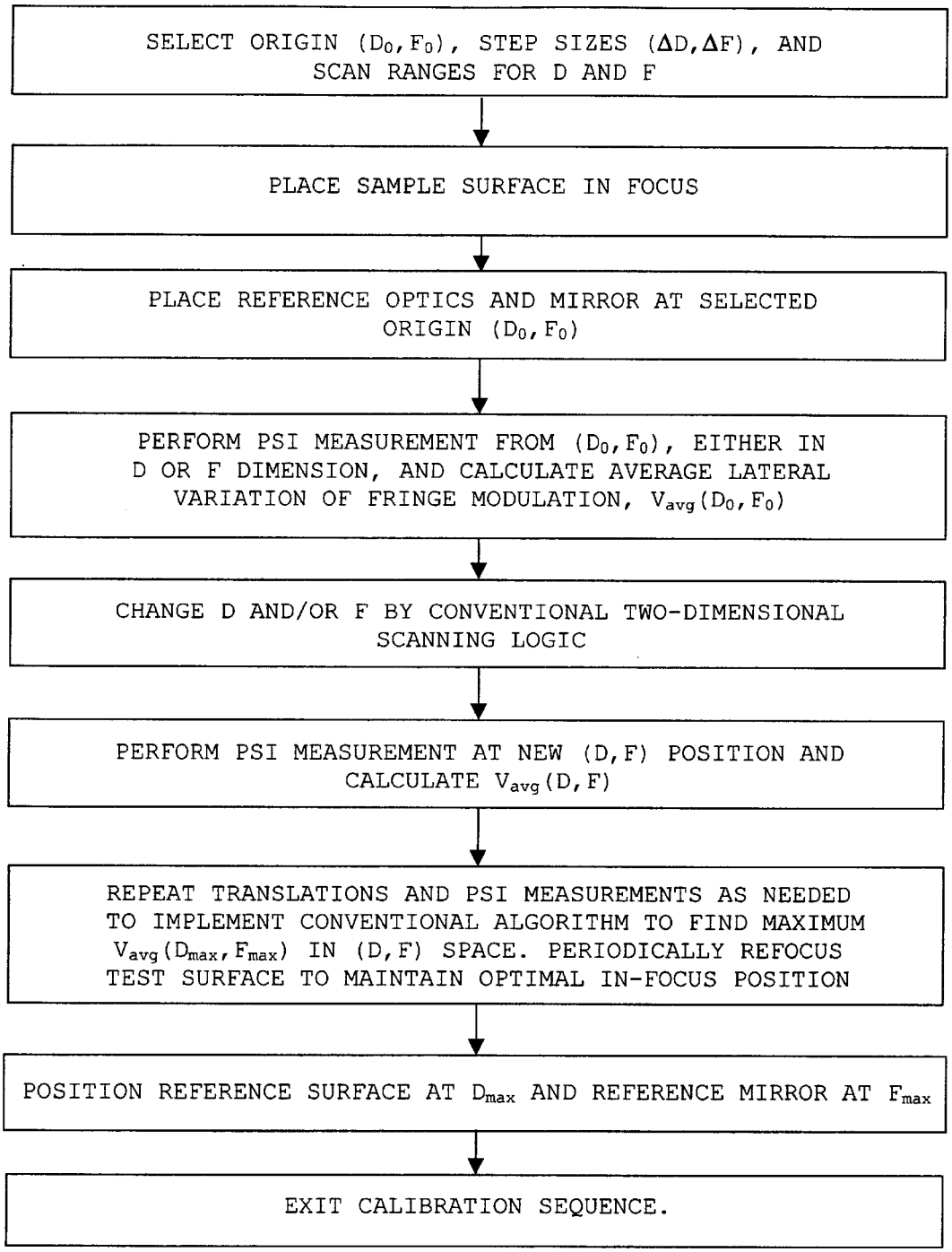
FIG. 12 is a diagram of the steps involved in producing minimum OPD and optimal reference-mirror focus by finding the peak of the average lateral variation of modulation as a function of OPD and focal position.

An origin, two sets of scanning ranges, and related steps are selected, in similar manner as the procedure outlined above, to cover predetermined ranges for both D and F. At every point in (D,F) space, PSI measurements are conducted, by scanning preferably in the D dimension, but alternatively in the F (or F') dimension, to measure fringe modulation for every pixel in the detector array. The lateral variation of modulation is then calculated for each pixel using Equation (2) and an average $V(x,y)$ for that D,F position, denoted by $V_{avg}(D,F)$, is computed by some arbitrary criterion, such as simple arithmetic average. This average $V(D,F)$ value represents a point on a three-dimensional $(V_{avg},D,F)$ surface that we found to have a single maximum corresponding to optimal D and F values. Repeating the calculation of $V_{avg}(D,F)$ at incremental D and F positions, this three-dimensional surface is generated and optimum focus and OPD positions are readily ascertained. As illustrated in FIG. 11, the surface 64 is monotonic, which facilitates the process of finding its single maximum using conventional numerical methods. This occurs when the OPD is minimized and the reference mirror is simultaneously in best focus. It is noted that this procedure can be carried out advantageously using any known numerical algorithm for finding the maximum of a surface in three-dimensional space. During this scanning operation, the focal distance F' of the sample surface S may need adjustment to maintain the sample in the optimal in-focus position, as would be obvious to one skilled in the art. We found that automatic periodic refocusing of the surface S by conventional methods facilitates the process. The steps of the procedure are outlined in FIG. 12.

Figure 13:
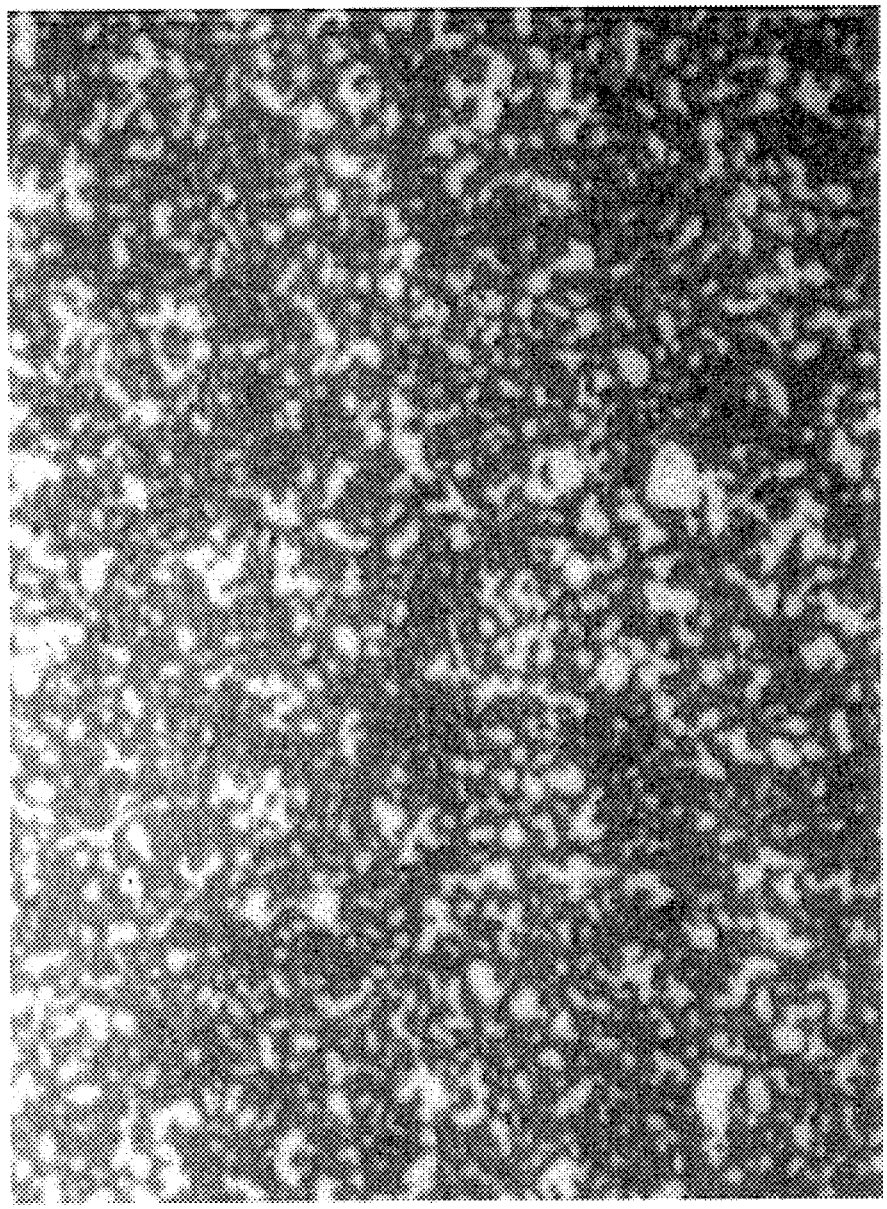
FIG. 13 shows an intensity image of an air bearing surface (ABS) found to be suitable for optimizing the OPD and focal position of an interferometric objective with the procedure outlined in FIG. 12.

We also discovered that a test surface S that is suitable for practicing this aspect of the invention is the air bearing surface (ABS) of a magnetic head. The ABS is a highly polished surface composed of multiple materials (typically aluminum oxide and titanium carbide). The reflectivity of these materials varies, such that, while the surface is smooth, an optical image of the surface exhibits bright and dark structural sections. This is illustrated in FIG. 13, which is an intensity image of a region of an ABS.

A primary commercial application of interference microscopes is in the measurement of the topography of magnetic heads. Within these heads, the height of the poles and shields utilized in the process of writing and reading data is critical. These heights are typically measured with respect to the nearby air bearing surface. Thus, optimization of the properties of the interference objective used to measure these heights can be done very advantageously with the test surface itself, thereby eliminating the need for a separate calibration surface.

Figure 14:
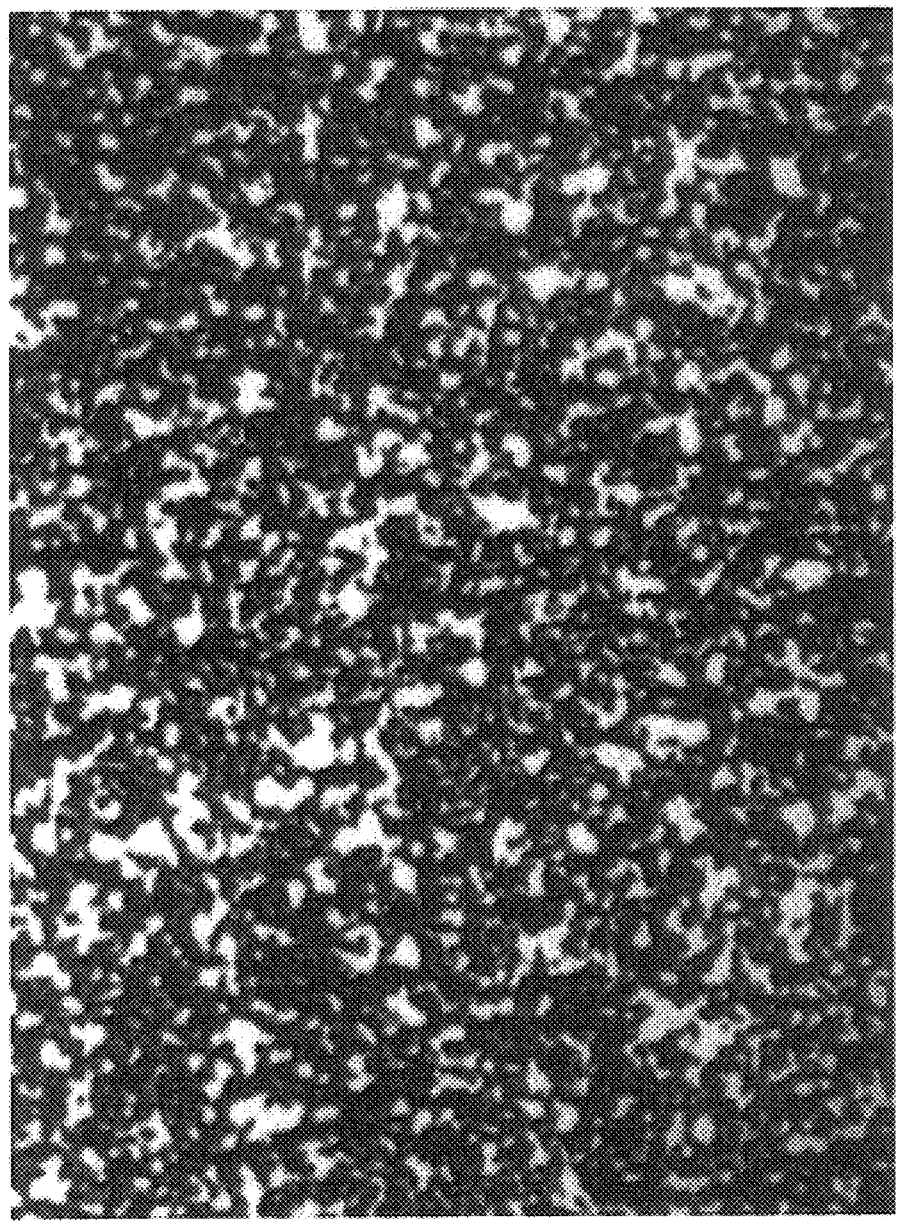
FIG. 14 is a modulation image of the air bearing surface of FIG. 13 produced at D and F positions optimized with the procedure outlined in FIG. 12.
Figure 15:
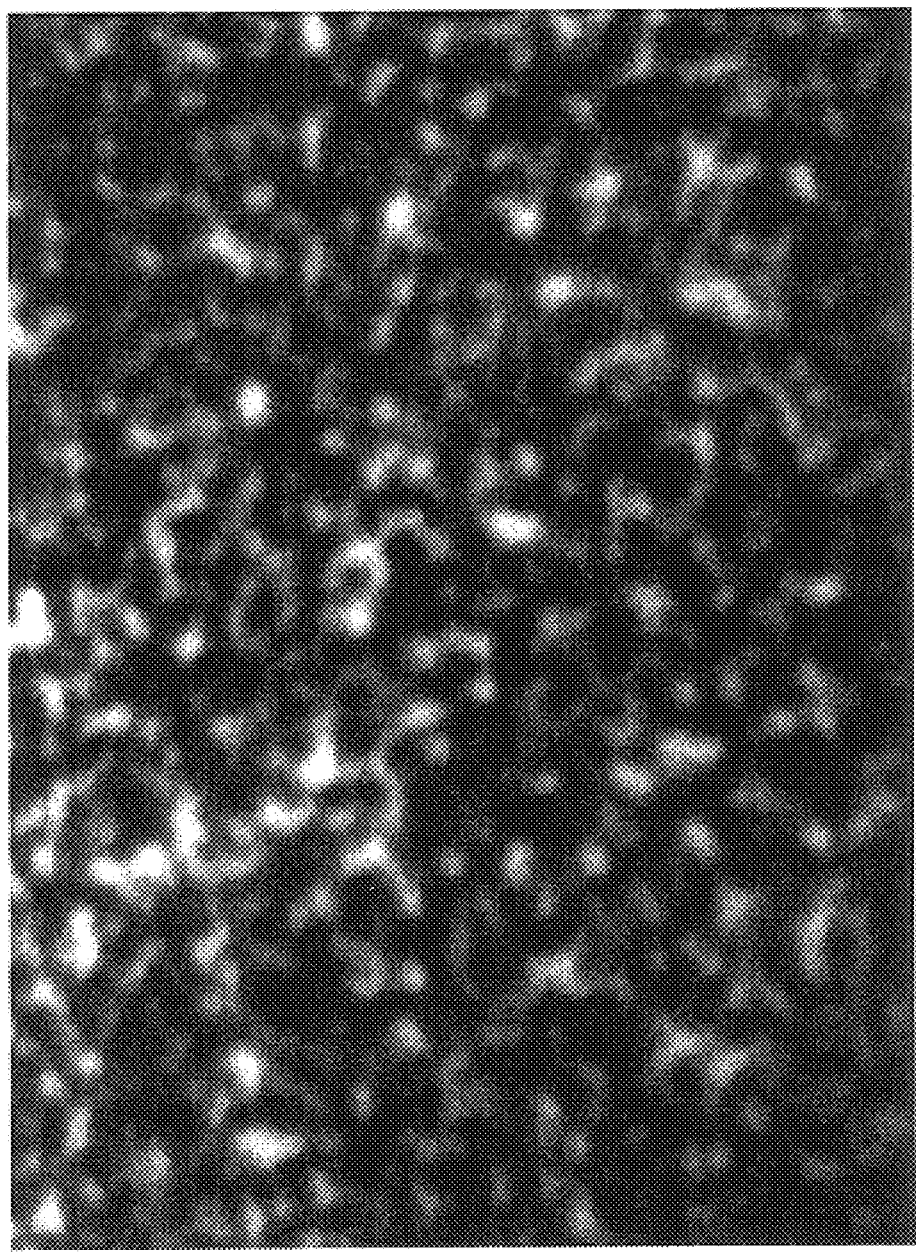
FIG. 15 is a modulation image of the air bearing surface of FIG. 13 produced at D and F positions that have not been optimized.

Those skilled in the art readily understand that theoretically the best conditions for performing a surface measurement by interferometry are achieved when maximum fringe contrast is produced, although practical considerations often warrant some additional adjustments. FIG. 14, corresponding to the sample surface of FIG. 13, is an example of the sharp fringe modulation produced when D and F are optimized according to the invention. In comparison, FIG. 15 is an example of the same modulation image produced when D and F have not been optimized.

Therefore, various changes in the details, steps and components that have been described may be made by those skilled in the art within the principles and scope of the invention herein illustrated and defined in the appended claims. For example, various kinds of long-range, linear scanning mechanisms could be used with equivalent results. Similarly, various alternative VSI or PSI algorithms known in the art could be used to find the position of maximum fringe contrast and maximum variation of fringe contrast. Moreover, the invention has been described in terms of a white-light instrument used for conducting surface measurements by phase-shifting interferometry, but it should not be so limited because the same principles can be applied to any interferometer using broad-bandwidth light, whether for PSI or VSI measurements. Thus, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method for minimizing the optical path difference between a test beam path and a reference beam path produced in an interference microscope objective having a reference-arm assembly that comprises a reference lens and a reference mirror, and having first scanning means for carrying out interference measurements of a test surface, the method comprising the following steps:

(a) providing second scanning means for translating the reference-arm assembly along said reference beam path;

(b) translating the reference-arm assembly through a plurality of positions along the reference beam path using said second scanning means;

(c) measuring a fringe modulation at predetermined locations corresponding to said plurality of positions along the reference beam path;

(d) determining a location of the reference-arm assembly along the reference beam path corresponding to an optimal fringe modulation; and (e) fixing said optimal-fringe-modulation location of the reference-arm assembly such that interferometric measurements of the test surface may be carried out by varying the optical path difference therefrom.

2. The method of claim 1, wherein said step (c) is carried out by performing phase-shifting interferometric measurements at each of said plurality of positions.

3. The method of claim 1, wherein said optimal fringe modulation is selected to correspond to a maximum fringe modulation and said step (d) is carried out by performing vertical-scanning interferometry analysis with the fringe modulation data produced by step (c) at each of said plurality of positions.

4. The method of claim 3, wherein said fringe modulation at each of said plurality of positions along the reference beam path is an average of modulation components calculated for individual pixels of a light detector.

5. The method of claim 1, wherein said second scanning means includes a gear motor.

6. The method of claim 1, wherein said steps (b), (c), (d) and (e) are carried out automatically.

7. A method for minimizing the optical path difference between a test beam path and a reference beam path produced in an interference microscope objective having a reference-arm assembly that comprises a reference lens and a reference mirror, and for contemporaneously optimizing the focal position of the reference mirror, wherein the objective comprises first scanning means for carrying out interference measurements of a test surface, the method comprising the following steps:

(a) providing second scanning means for translating the reference-arm assembly in an OPD dimension along said reference beam path;

(b) providing third scanning means for translating the reference mirror with respect to the reference lens in a focal-distance dimension along said reference beam path;

(c) measuring a fringe modulation at predetermined locations corresponding to a plurality of OPD and focal-distance positions obtained using said second and third scanning means;

(d) calculating a lateral variation of fringe modulation for each of said predetermined locations;

(e) determining an optimal OPD position and an optimal focal-distance position corresponding to an optimal lateral variation of fringe modulation; and (f) fixing the OPD and focal-distance positions at said optimal OPD and focal-distance positions such that interferometric measurements of the test surface may be carried out by varying the OPD therefrom.

8. The method of claim 7, wherein said step (c) is carried out by performing phase-shifting interferometric measurements at each of said plurality of OPD and focal-distance positions.

9. The method of claim 7, wherein said optimal lateral variation of fringe modulation is selected to correspond to a maximum lateral variation of fringe modulation and said step (e) is carried out by finding said maximum using the lateral variation of fringe modulation calculated for said predetermined locations.

10. The method of claim 9, wherein said step (e) is carried out by performing vertical-scanning interferometry analysis with the later variation of fringe modulation data produced by step (d) at each of said plurality of positions.

11. The method of claim 9, wherein said lateral variation of fringe modulation at each of said predetermined locations is an average of lateral variation of fringe modulation components calculated for individual pixels of a light detector.

12. The method of claim 7, wherein each of said second and third scanning means includes a gear motor.

13. The method of claim 7, wherein said steps (c), (d), (e) and (f) are carried out automatically.

14. An apparatus for minimizing the optical path difference between a test beam path and a reference beam path produced in an interference microscope objective having a reference-arm assembly that comprises a reference lens and a reference mirror and having first scanning means to carry out interference measurements of a test surface, comprising:

second scanning means to effect a translation of the reference-arm assembly along said reference beam path;

means for measuring a fringe modulation at a plurality of positions along the reference beam path scanned by said second scanning means;

means for determining a position of the reference-arm assembly along the reference beam path corresponding to an optimal fringe modulation; and means for fixing said position of the reference-arm assembly such that interferometric measurements of the test surface may be carried out by translating the reference-arm assembly therefrom.

15. The apparatus of claim 14, wherein said optimal fringe modulation is selected to correspond substantially to maximum fringe modulation.

16. The apparatus of claim 15, wherein said means for determining a position of the reference-arm assembly along the reference beam path corresponding to maximum fringe modulation includes means for carrying out vertical-scanning interferometry analysis with the fringe modulation data measured at each of said plurality of positions.

17. The apparatus of claim 14, wherein said means for measuring a fringe modulation at a plurality of positions includes means for carrying out phase-shifting interferometric measurements at each of said plurality of positions.

18. The apparatus of claim 14, wherein said fringe modulation at each of said plurality of positions along the reference beam path is an average of fringe-modulation components calculated for individual pixels of a light detector.

19. The apparatus of claim 14, wherein said second scanning means includes a gear motor.

20. An apparatus for minimizing the optical path difference between a test beam path and a reference beam path produced in an interference microscope objective having a reference-arm assembly that comprises a reference lens and a reference mirror, and for contemporaneously optimizing the focal position of the reference mirror, the apparatus having first scanning means for carrying out interference measurements of a test surface, comprising:

second scanning means for translating the reference-arm assembly in an OPD dimension along said reference beam path;

third scanning means for translating the reference mirror with respect to the reference lens in a focal-distance dimension along said reference beam path;

means for measuring a fringe modulation at predetermined locations corresponding to a plurality of OPD and focal-distance positions obtained using said second and third scanning means;

means for calculating a lateral variation of fringe modulation for each of said predetermined locations;

means for determining an optimal OPD and focal-distance position corresponding to an optimal lateral variation of fringe modulation; and means for fixing the OPD and focal-distance positions at said optimal OPD and focal-distance positions such that interferometric measurements of the test surface may be carried out by varying the OPD therefrom.

21. The apparatus of claim 20, wherein said optimal lateral variation of fringe modulation is selected to correspond substantially to a maximum lateral variation of fringe modulation.

22. The apparatus of claim 21, wherein said means for determining an optimal OPD and focal-distance position corresponding to a maximum lateral variation of fringe modulation includes means for carrying out vertical-scanning interferometry analysis with lateral variation of fringe modulation data calculated at said predetermined locations.

23. The apparatus of claim 20, wherein said means for measuring a fringe modulation at predetermined locations corresponding to a plurality of OPD and focal-distance positions includes means for carrying out phase-shifting interferometric measurements at each of said plurality of OPD and focal-distance positions.

24. The apparatus of claim 20, wherein said lateral variation of fringe modulation for each of said predetermined locations corresponding to said plurality of OPD and focal-distance positions is an average of lateral variation of fringe-modulation components calculated for individual pixels of a light detector.

25. The apparatus of claim 20, wherein each of said second and third scanning means include a gear motor.

* * * * *